US012182855B2

(12) United States Patent
Frederick et al.

(10) Patent No.: US 12,182,855 B2
(45) Date of Patent: Dec. 31, 2024

(54) MULTI-DIMENSIONAL COMMERCE PLATFORM

(71) Applicant: eBay Inc., San Jose, CA (US)

(72) Inventors: Gail Anna Rahn Frederick, Portland, OR (US); Tatjana Vlahovic, San Jose, CA (US); Sanjeev Katariya, Campbell, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/676,950

(22) Filed: Feb. 22, 2022

(65) Prior Publication Data

US 2022/0180422 A1    Jun. 9, 2022

Related U.S. Application Data

(63) Continuation of application No. 16/805,965, filed on Mar. 2, 2020, now Pat. No. 11,295,373, which is a continuation of application No. 15/642,979, filed on Jul. 6, 2017, now Pat. No. 10,607,276.

(51) Int. Cl.
*G06Q 30/0601* (2023.01)

(52) U.S. Cl.
CPC ..... *G06Q 30/0641* (2013.01); *G06Q 30/0601* (2013.01); *G06Q 30/0613* (2013.01); *G06Q 30/0625* (2013.01)

(58) Field of Classification Search
CPC .... G06Q 30/0601–0643; G06Q 10/087; G06F 40/40–58
See application file for complete search history.

(56) References Cited

U.S. PATENT DOCUMENTS

| 8,694,389 | B1 | 4/2014 | Chowdhary et al. |
| 9,384,286 | B2 | 7/2016 | Gardner et al. |
| 11,295,373 | B2 | 4/2022 | Frederick et al. |
| 2005/0240392 | A1 | 10/2005 | Munro et al. |
| 2009/0171802 | A1* | 7/2009 | Raygoza ............ G06Q 30/0603 705/26.1 |
| 2010/0121735 | A1 | 5/2010 | Shimooka |

(Continued)

FOREIGN PATENT DOCUMENTS

| WO | 2016154965 | 10/2016 |
| WO | 2019010055 | 1/2019 |

OTHER PUBLICATIONS

U.S. Appl. No. 15/642,979 U.S. Pat. No. 10,607,276, filed Jul. 6, 2017, Multi-Dimensional Commerce Platform.

(Continued)

*Primary Examiner* — William J Allen
(74) *Attorney, Agent, or Firm* — SCHWEGMAN LUNDBERG & WOESSNER, P.A.

(57) ABSTRACT

Aspects of the present disclosure relate to a multi-dimensional commerce platform that may be utilized for the communication of data. Aspects of the multi-dimensional commerce platform may include various functional components to facilitate a system to receive inventory data at a first server associated with the multi-dimensional commerce platform, provide a second server associated with a third-party (e.g., a third party seller/distributor) access to the inventory data, alter or modify the inventory data based on attributes of the second server, and cause display of a presentation of the modified inventory data at a client device.

16 Claims, 9 Drawing Sheets

(56) References Cited

U.S. PATENT DOCUMENTS

| | | |
|---|---|---|
| 2014/0214591 A1 | 7/2014 | Kotinaga |
| 2014/0278849 A1 | 9/2014 | Harrington |
| 2015/0095185 A1 | 4/2015 | Katukuri et al. |
| 2015/0134372 A1 | 5/2015 | Lopez Ruiz et al. |
| 2016/0291807 A1 | 10/2016 | Chong et al. |
| 2016/0380904 A1* | 12/2016 | Fuller .................. H04L 67/10 709/226 |
| 2017/0169014 A1 | 6/2017 | Sotelo et al. |
| 2018/0349394 A1 | 12/2018 | Hu et al. |
| 2019/0012713 A1 | 1/2019 | Frederick et al. |
| 2020/0202418 A1 | 6/2020 | Frederick et al. |

OTHER PUBLICATIONS

U.S. Appl. No. 16/805,965 U.S. Pat. No. 11,295,373, filed Mar. 2, 2020, Multi-Dimensional Commerce Platform.

"International Application Serial No. PCT US2018 039991, International Search Report mailed Sep. 17, 2018", 4 pgs.

"International Application Serial No. PCT US2018 039991, Written Opinion mailed Sep. 17, 2018", 6 pgs.

"U.S. Appl. No. 15/642,979, Non Final Office Action mailed Jun. 28, 2019", 17 pgs.

"U.S. Appl. No. 15/642,979, Notice of Allowance mailed Nov. 20, 2019", 12 pgs.

"International Application Serial No. PCT US2018 039991, International Preliminary Report on Patentability mailed Jan. 16, 2020", 8 pgs.

"U.S. Appl. No. 15/642,979, Corrected Notice of Allowability mailed Jan. 28, 2020", 4 pgs.

"U.S. Appl. No. 15/642,979, Corrected Notice of Allowability mailed Feb. 12, 2020", 4 pgs.

"U.S. Appl. No. 16/805,965, Non Final Office Action mailed May 28, 2021", 19 pgs.

"U.S. Appl. No. 16/805,965, Examiner Interview Summary mailed Aug. 13, 2021", 2 pgs.

"U.S. Appl. No. 16/805,965, Final Office Action mailed Oct. 7, 2021", 15 pgs.

"U.S. Appl. No. 16/805,965, Examiner Interview Summary mailed Nov. 18, 2021", 3 pgs.

"U.S. Appl. No. 16/805,965, Notice of Allowance mailed Jan. 21, 2022", 9 pgs.

Gerald, Lohse L, "Internet retail store design: How the user interface influences traffic and sales", Journal of Computer-Mediated Communication, vol. 5, Issue 2, JCMC522, [Online] Retrieved from the internet:https: doi.Org 10.1111 j.1083-6101.1999.tb00339.x, (Dec. 1, 1999).

Trivago, "Trivago: Compare Hotels from Different Booking Sites", Retrieved from Internet: URL: https: www.trivago.com , (Accessed on Aug. 7, 2018), 3 pages.

* cited by examiner

MULTI-DIMENSIONAL COMMERCE PLATFORM

CLAIM OF PRIORITY

This Application is a continuation of U.S. application Ser. No. 16/805,965, filed Mar. 2, 2020, which is a continuation of U.S. application Ser. No. 15/642,979, filed Jul. 6, 2017, and now U.S. Pat. No. 10,607,276, which are both hereby incorporated by reference in its entirety.

TECHNICAL FIELD

The subject matter of the present disclosure generally relates methods and systems supporting online consumer interactions by users in networked systems.

BACKGROUND

Conventional network-based marketplaces (e.g. consumer websites) provide users with functionality to browse a collection of items (e.g. goods or services) at a website and to make purchases of those items using various means, on the website. While centralized e-commerce over the web solves the problem of reaching the largest possible user-base within a single market, this centralized model lacks the scalability required to reach multiple markets and user bases simultaneously.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
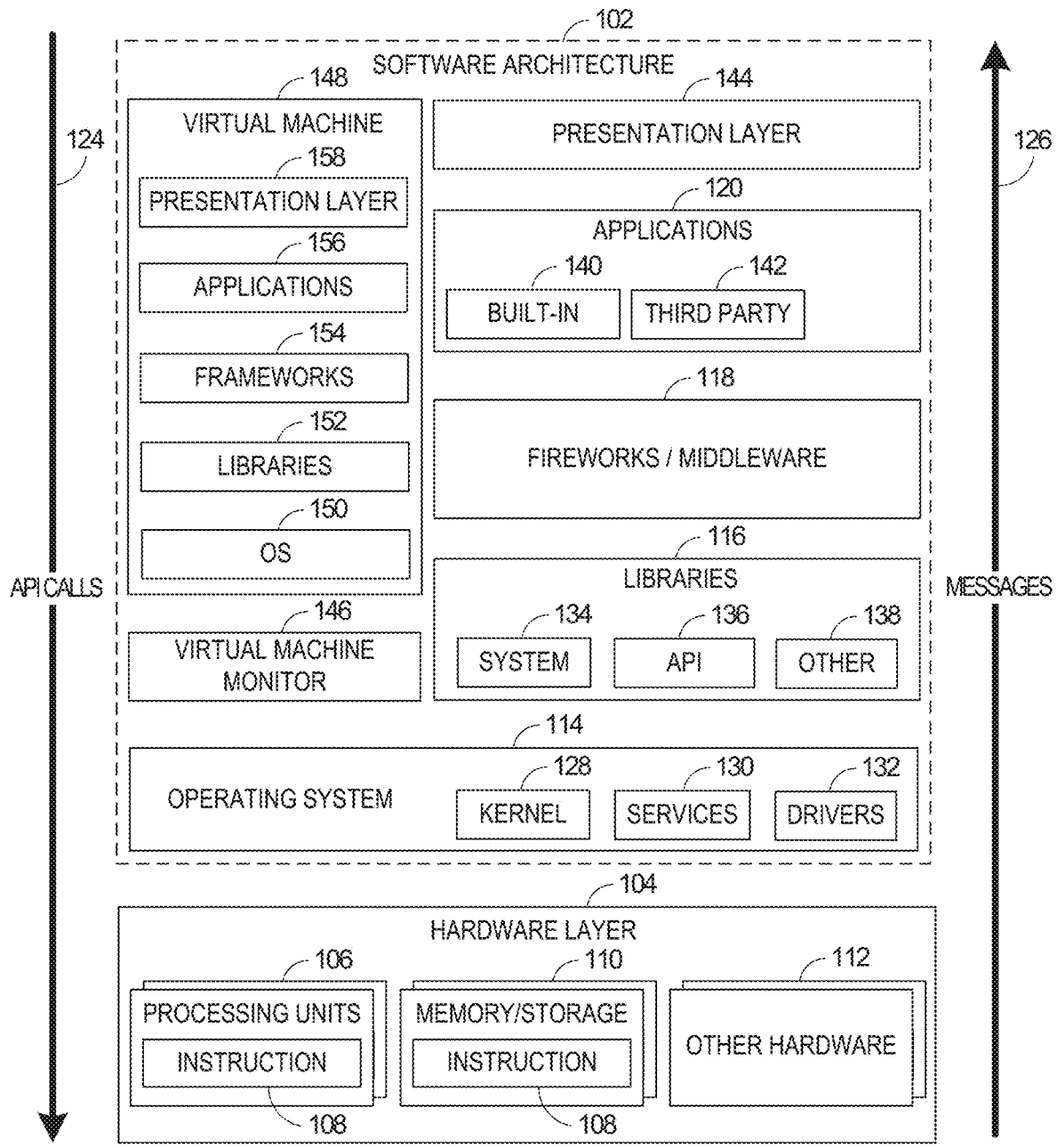
FIG. 1 is a block diagram illustrating an example of a software architecture that may be installed on a machine, according to some example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Presently, enormous amounts of resources are expended by manufacturers in the marketing and distribution of products to diverse markets. To reach and appeal to multiple distinct markets (e.g., foreign markets, distinct demographics), a single seller may maintain and manage multiple web presences, wherein each web presence may be marketed differently, in different languages, or may even ship products from different locations due to logistical restrictions. As a result, users in small and less popular markets are often unable to purchase or even search for items outside of their own market due to language barriers, logistical issues related to currency exchange or payment methods, and a lack of sellers willing or able to ship to locations within their market.

Similarly, sellers in small, less popular markets are often unable to breach a larger audience, due to limitations in their ability to market or distribute inventory outside of their own market. For example, a merchant in a small market may be unable to support traffic/bandwidth from larger markets outside of their own, or may be unable to facilitate transactions across markets due to differences in payment methods or currency exchange rates. As a result, potential growth of these smaller merchants is limited.

Below are described various aspects of a multi-dimensional commerce platform that may be utilized for the communication of data. Aspects of the multi-dimensional commerce platform may include various functional components to facilitate a system to receive inventory data at a first server associated with the multi-dimensional commerce platform, provide a second server associated with a third-party (e.g., a third party seller/distributor) access to the inventory data, alter or modify the inventory data based on attributes of the second server, and cause display of a presentation of the modified inventory data at a client device. In some example embodiments as discussed herein, the inventory data may be received from an inventory database of a seller. The seller may include high volume sellers which collect inventory data from multiple decentralized sources (e.g., Autotrader, StubHub), as well as a seller that maintains and manages inventory as a single point distributor. Thus, the inventory data may include aggregated inventory collected at the seller database from multiple distinct sellers, as well an inventory data managed and distributed by the seller independently.

A user may transmit a search request to the second server through a graphical user interface displayed at a client device. In response, the second server accesses the inventory data gathered from the first server to generate and cause display of a set of search results that include items from among the inventory data at the client device. The inventory data may comprise a set of items, wherein each item among the set of items has item attributes (e.g., an tem description, a list price, a seller identifier, shipping details, item images, display language). In some example embodiments, the multi-dimensional commerce platform may enable the second server to provide display configuration details, such that the inventory data may be altered or modified before being presented at the client device, when the inventory data is accessed through the second server (i.e., instead of the first server). For example, the item attributes of the inventory data may be modified by changing a display language, adjusting a price, and changing a shipping location or shipping options associated with an item.

The multi-dimensional commerce platform may receive transaction requests for items from among the inventory data, through the second server. The transaction requests received at the second server may be routed to the first server in order to cause a purchase of an item. In such embodiments, from the perspective of a listing seller associated with the item, the purchase of the item would appear to have been through the first server, while from the perspective of a buyer of the item through the second server, the purchase of the item would appear to be entirely through the second server.

In some example embodiments, the multi-dimensional commerce platform may share a portion of inventory data in a first server with a second server. For example, the multi-dimensional commerce platform may receive an inventory search request from a third party associated with the second server, wherein the inventory search requests identifies an item or product category. For example, the inventory search request may indicate a specific sport or sporting event (e.g., basketball, NBA Finals), sports team (e.g., Golden State Warriors), or product category (e.g., sports memorabilia). In response, the multi-dimensional commerce platform may identify a subset of the inventory data based on the inventory search request, and provide the second server with access to the subset. The third party associated with the second server may thereby generate and cause display of a graphical user interface that includes a presentation of the subset of the inventory data, wherein the presentation of the subset is further based on one or more presentation configurations (e.g., a display language, a display currency, shipping methods and price, additional fees).

In further embodiments, the multi-dimensional commerce platform may receive inventory data from a third party seller (e.g., StubHub), directly receive inventory requests from client devices, and alter a presentation of the inventory data for display at the client devices. For example, normally, the third party seller may host and distribute an inventory of items via a third party website, wherein the third party website is accessible through an associated Uniform Resource Locator (URL). A client device may therefore view and shop the inventory of the third party seller by accessing the URL through a browser, and in response the third party seller generates and causes display of a presentation of the inventory data at the client device. While effective, the standard procedure greatly limits the reach of a small third party seller to a wide market. Additionally, the third party seller may not be suited to handle larger volumes of traffic.

The multi-dimensional commerce platform may therefore receive the inventory data directly from the third party seller, wherein the inventory data comprises a set of items with corresponding item attributes. Upon receiving an inventory request from a client device, the multi-dimensional commerce platform may alter the presentation of the inventory data to appear as though the inventory data is offered for sale through the multi-dimensional commerce platform. Thus, from the perspective of the client device, a transaction would appear to occur between the client device and the multi-dimensional commerce platform. The multi-dimensional commerce platform may thereby route a transaction request received from an item from among the inventory of items to the third party seller.

In some example embodiments, the multi-dimensional commerce platform may maintain a presentation configuration database. The presentation configuration database may comprise one or more presentation configurations, each associated with a corresponding source server (e.g., the second server). In response to receiving access requests for inventory data, the multi-dimensional commerce platform may parse the access requests to identify an identifier of a source of the requests (e.g., the second server), and retrieve a corresponding presentation configuration associated with the source. The multi-dimensional commerce platform may modify or alter the requested inventory data in real-time, prior to distributing the inventory data to the requesting source. In this way, the presentation of the inventory data may be based on the requesting source.

In further example embodiments, the multi-dimensional commerce system may cause the first server to access and retrieve inventory data from the second server, and to modify or alter the inventory data for presentation outside of the second server. The inventory data from the second server may thereby be accessible by users through the first server or the second server, such that presentation of the inventory data vary based on the server in which a user accesses or searches for the inventory data. For example, a user searching for an item among the inventory data through a first web site linked to the first server may be presented with a first presentation of the item (e.g., in a specified language, price, or presentation format), while a user searching for the item among the inventory data through a second web site linked to the second server may be presented with a second presentation of the item, wherein the second presentation differs from the first presentation.

FIG. 1 is a block diagram illustrating an example of a software architecture that may be installed on a machine, according to some example embodiments. FIG. 1 is merely a non-limiting example of a software architecture, and it will be appreciated that many other architectures may be implemented to facilitate the functionality described herein. The software architecture 102 may be executing on hardware such as a machine 800 of FIG. 8 that includes, among other things, processors 810, memory 830, and I/O components 850. A representative hardware layer 104 is illustrated and can represent, for example, the machine 800 of FIG. 8. The representative hardware layer 104 comprises one or more processing units 106 having associated executable instructions 108. The executable instructions 108 represent the executable instructions of the software architecture 102, including implementation of the methods, modules, and so forth of FIGS. 3-6. The hardware layer 104 also includes memory or storage modules 110, which also have the executable instructions 108. The hardware layer 104 may also comprise other hardware 112, which represents any other hardware of the hardware layer 104, such as the other hardware illustrated as part of the machine 100.

In the example architecture of FIG. 1, the software architecture 102 may be conceptualized as a stack of layers, where each layer provides particular functionality. For example, the software architecture 102 may include layers such as an operating system 114, libraries 116, frameworks/middleware 118, applications 120, and a presentation layer 1044. Operationally, the applications 120 or other components within the layers may invoke API calls 124 through the software stack and receive a response, returned values, and so forth (illustrated as messages 126) in response to the API calls 124. The layers illustrated are representative in nature, and not all software architectures have all layers. For example, some mobile or special purpose operating systems may not provide a frameworks/middleware 118 layer, while others may provide such a layer. Other software architectures may include additional or different layers.

The operating system 114 may manage hardware resources and provide common services. The operating system 114 may include, for example, a kernel 128, services 130, and drivers 132. The kernel 128 may act as an abstraction layer between the hardware and the other software layers. For example, the kernel 128 may be responsible for memory management, processor management (e.g., scheduling), component management, networking, security settings, and so on. The services 130 may provide other common services for the other software layers. The drivers 132 may be responsible for controlling or interfacing with the underlying hardware. For instance, the drivers 132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 116 may provide a common infrastructure that may be utilized by the applications 120 and/or other components and/or layers. The libraries 116 typically provide functionality that allows other software modules to perform tasks in an easier fashion than by interfacing directly with the underlying operating system 114 functionality (e.g., kernel 128, services 130, or drivers 132). The libraries 116 may include system 134 libraries (e.g., C standard library) that may provide functions such as memory allocation functions, string manipulation functions, mathematic functions, and the like. In addition, the libraries 116 may include API libraries 136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 116 may also include a wide variety of other libraries 138 to provide many other APIs to the applications 120 and other software components/modules.

The frameworks 118 (also sometimes referred to as middleware) may provide a higher-level common infrastructure that may be utilized by the applications 120 or other software components/modules. For example, the frameworks 118 may provide various graphic user interface (GUI) functions, high-level resource management, high-level location services, and so forth. The frameworks 118 may provide a broad spectrum of other APIs that may be utilized by the applications 120 and/or other software components/modules, some of which may be specific to a particular operating system or platform.

The applications 120 include built-in applications 140 and/or third party applications 142. Examples of representative built-in applications 140 may include, but are not limited to, a contacts application, a browser application, a book reader application, a location application, a media application, a messaging application, or a game application. The third party applications 142 may include any of the built-in applications, as well as a broad assortment of other applications. In a specific example, the third party application 142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 142 may invoke the API calls 124 provided by the mobile operating system such as the operating system 114 to facilitate functionality described herein.

The applications 120 may utilize built-in operating system functions (e.g., kernel 128, services 130, or drivers 132), libraries (e.g., system 134, APIs 136, and other libraries 138), or frameworks/middleware 118 to create user interfaces to interact with users of the system. Alternatively, or additionally, in some systems, interactions with a user may occur through a presentation layer, such as the presentation layer 144. In these systems, the application/module "logic" can be separated from the aspects of the application/module that interact with the user.

Some software architectures utilize virtual machines. In the example of FIG. 1, this is illustrated by a virtual machine 148. A virtual machine creates a software environment where applications/modules can execute as if they were executing on a hardware machine e.g., the machine 100 of FIG. 1, for example). A virtual machine is hosted by a host operating system (e.g., operating system 114) and typically, although not always, has a virtual machine monitor 146, which manages the operation of the virtual machine as well as the interface with the host operating system (e.g., operating system 114). A software architecture executes within the virtual machine 148, such as an operating system 150, libraries 152, frameworks/middleware 154, applications 156, or a presentation layer 158. These layers of software architecture executing within the virtual machine 148 can be the same as corresponding layers previously described or may be different.

Figure 2:
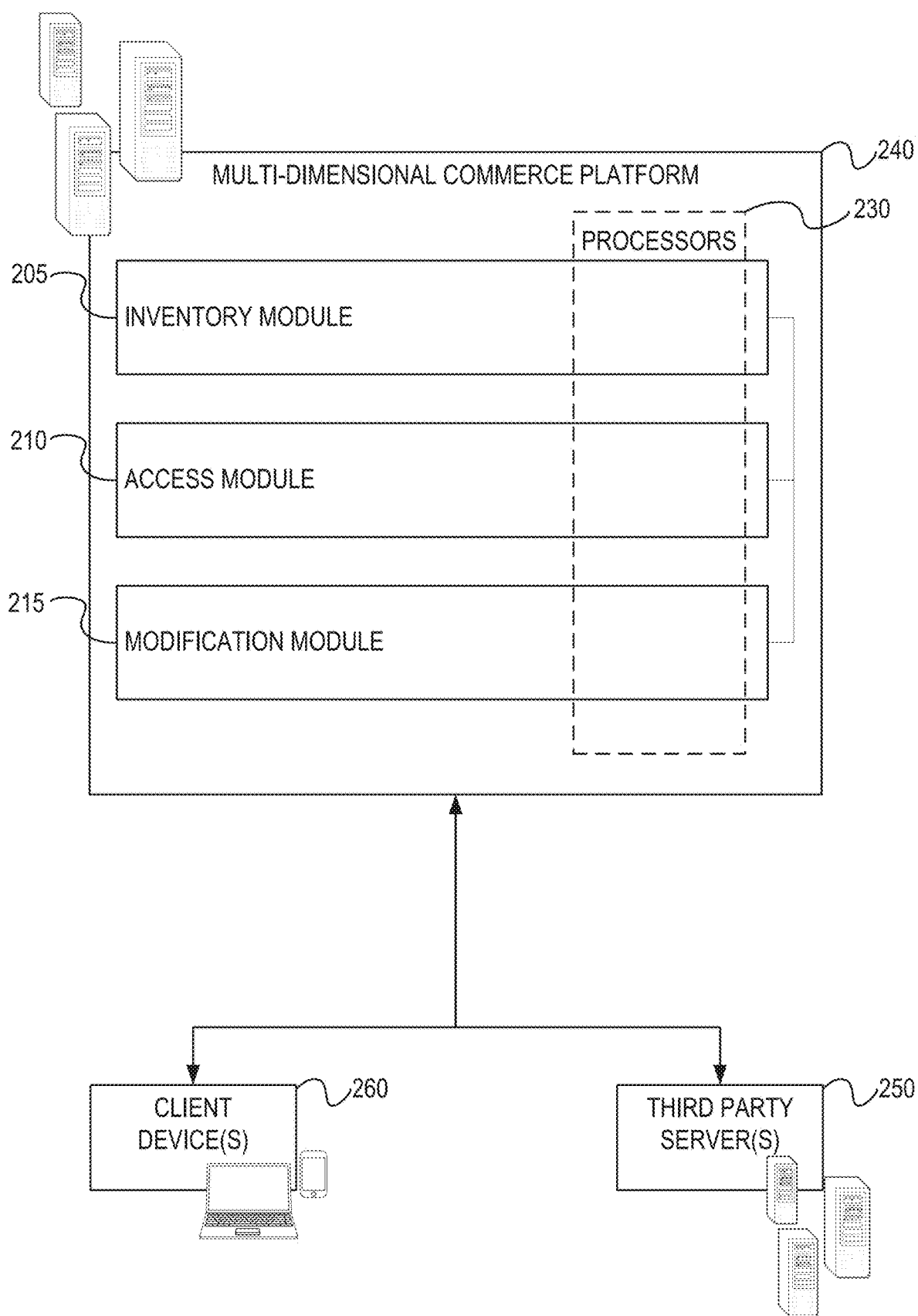
FIG. 2 is a block diagram illustrating various functional components of a multi-dimensional commerce platform, which is provided as part of the networked system, according to example embodiments.

FIG. 2 is a block diagram illustrating components of a multi-dimensional commerce platform 240 that provide functionality to maintain inventory data at a server, allow access to the inventory data to one or more third party servers, modify or alter the inventory data based on a source of a request to access the data, generate and cause display of a presentation of the modified inventory data, and facilitate transactions for items. The multi-dimensional commerce platform 240 is show as including an inventory module 205, an access module 210, and a modification module 215, all configured to communicate with each other (e.g., via a bus, shared memory, or a switch). Any one or more of these modules may be implemented using one or more processors 230 (e.g., by configuring such one or more processors to perform functions described for that module) and hence may include one or more of the processors 230.

Any one or more of the modules described may be implemented using dedicated hardware alone (e.g., one or more of the processors 230 of a machine) or a combination of hardware and software. For example, any module described of the multi-dimensional commerce platform 240 may physically include an arrangement of one or more of the processors 230 (e.g., a subset of or among the one or more processors of the machine) configured to perform the operations described herein for that module. As another example, any module of the multi-dimensional commerce platform 240 may include software, hardware, or both, that configure an arrangement of one or more processors 230 (e.g., among the one or more processors of the machine) to perform the operations described herein for that module. Accordingly, different modules of the multi-dimensional commerce platform 240 may include and configure different arrangements of such processors 230 or a single arrangement of such processors 230 at different points in time. Moreover, any two or more modules of the multi-dimensional commerce platform 240 may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some example embodiments, the multi-dimensional commerce platform 240 may be in communication with third party server(s) 250, and client device(s) 260. For example, the multi-dimensional commerce platform 240 may communicate, provide access, or stream, data (e.g., inventory data) to the third party server(s) 250 in response to receiving a data access request from the third party server(s) 250. Similarly, the multi-dimensional commerce platform 240 may receive data from the client device(s) 260 (e.g., inventory data).

Figure 3:
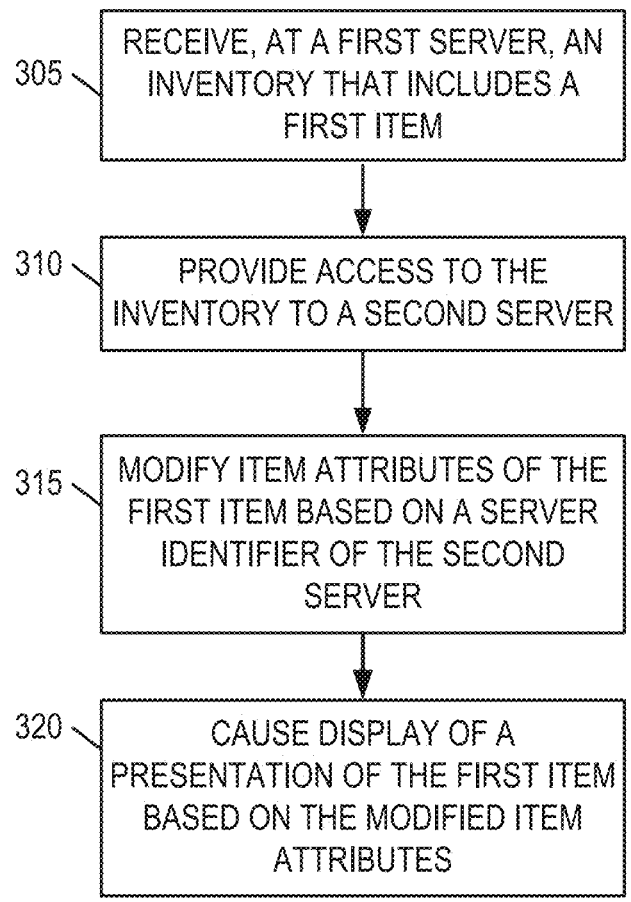
FIG. 3 is a flow chart illustrating a method for causing display of a presentation of an item from among an inventory of items at a client device, according to an example embodiment.

FIG. 3 is a flow chart illustrating a method 300 for causing display of a presentation of an item from among an inventory of items at a client device, according to an example embodiment. The method 300 may be embodied in computer-readable instructions for execution by one or more processors (e.g., processors 230 of FIG. 2) such that the steps of the method 300 may be performed in part or in whole by functional components (e.g., modules) of a client device or the multi-dimensional commerce platform 240; accordingly, the method 300 is described below by way of example with reference thereto. However, it shall be appreciated that the method 300 may be deployed on various other hardware configurations and is not intended to be limited to the functional components of the client device or the multi-dimensional commerce platform 240.

At operation 305, the inventory module 205 receives inventory data that includes at least a first item. For example, a client device 260 may provide the inventory module 205 with inventory data that represents an inventory of items, and wherein the inventory data comprises a set of items, wherein each item among the set of items has an associated set of item attributes. The item attributes may include an item description, an item price, item images, as well as shipping details.

At operation 310, the access module 210 provides a second server (e.g., third party servers 250) with access to the inventory data. The access module 210 may receive an inventory request from an administrator of the third party servers 250, wherein the inventory requests comprises a set of search terms and an identifier of the third party servers 250. In response to receiving the inventory request, the access module 210 provides the third party servers 250 with a portion of the inventory data, wherein the portion of the inventory data is based on the search terms of the inventory request.

For example, the inventory request may include search terms specifying a product category, a brand, or one or more item attributes (e.g., price, seller identifier, time on sale). In response to receiving the inventory request, the access module 210 searches the inventory data to identify one or more items among the inventory data based on the inventory request.

In some example embodiments the second server (e.g., third party servers 250) may be associated with a particular product category or inventory request by the multi-dimensional commerce platform 240, such that as inventory data is received by the inventory module 205, the access module 210 scans the inventory data to identify relevant items among the inventory data to share with the second server. The second server may be associated with the product category "sporting goods." As the inventory module 205 receives inventory data, the access module 210 may access and parse the inventory data to identify items among the inventory data associated with the "sporting goods" product category. The access module 210 may thereby share the portion of the inventory data related to sporting goods to the second server.

At operation 315, the modification module 215 modifies one or more item attributes of items among the portion of the inventory data. In some example embodiments, the modification module 215 modifies the item attributes based on the server identifier of the second server. For example, the multi-dimensional commerce platform 240 may maintain a database comprising configuration instructions of a set of servers based on server identifiers of each server among the set of servers. The configuration instructions may for example include a display language, pricing instructions, and display instructions. In further embodiments, the configuration instructions may be located at a database maintained by the second server itself, and the modification module 215 may cause the second server to modify the item attributes locally before being displayed at the client device 260.

The modification of the item attributes of the items from among the portion of the inventory data may include altering a display language of the item, adding, removing, resizing, or adjusting item images associated with the item from among the portion of the inventory data, as well as adjusting a price associated with the item (e.g., increasing or decreasing the price by a predefined amount or percentage). In further embodiments, the modification of the item attributes may include changing shipping details associated with the item from among the portion of items.

At operation 320, the second server (e.g., third party servers 250) generates and causes display of a presentation of the modified portion of the inventory data at a client device 260. For example, the client device 260 may interact with the second server, by transmitting a display request to display the portion of the inventory data. In response the second server generates and causes display of a presentation based on the modified portion of the inventory data.

Figure 4:
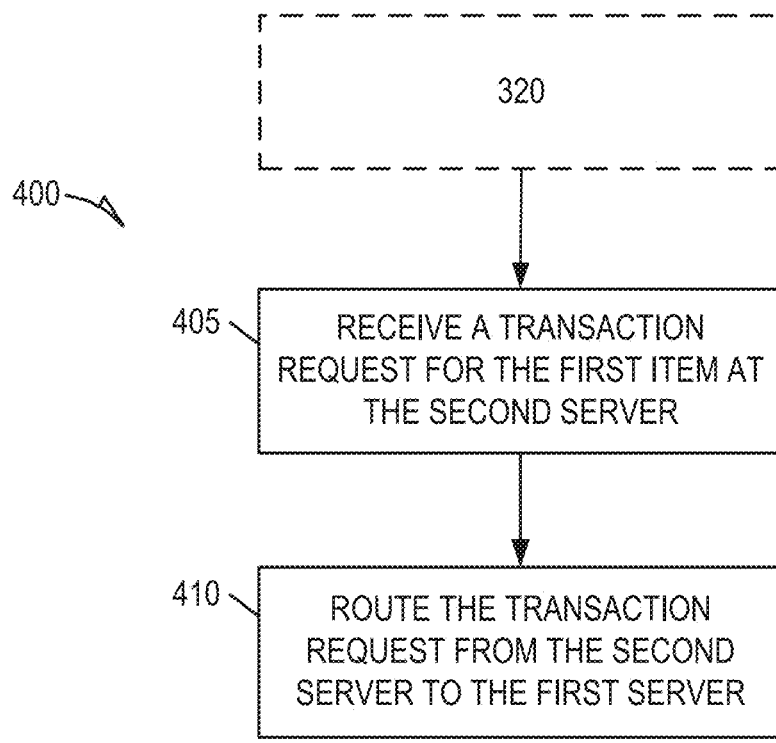
FIG. 4 is a flow chart illustrating a method for facilitating a transaction for an item, according to an example embodiment.

FIG. 4 is a flow chart illustrating a method 400 for facilitating a transaction for an item, according to an example embodiment. The method 400 may be embodied in computer-readable instructions for execution by one or more processors (e.g., processors 230 of FIG. 2) such that the steps of the method 400 may be performed in part or in whole by functional components (e.g., modules) of a client device or the multi-dimensional commerce platform 240; accordingly, the method 400 is described below by way of example with reference thereto. The method 400 may be performed as a subroutine of operation 320 of the method 300, wherein a presentation of an item is generated and displayed based on modified inventory data.

At operation 405, the second server (e.g., third party server 250) receives a transaction request for an item from a client device 260. For example, the second server may have generated and caused display of the modified portion of the inventory data at the client device 260. A user of the client device 260 may provide a user input that includes a transaction request to purchase an item, wherein the transaction request includes an identification of the item.

At operation 410, the second server facilitates a transaction for the item identified by the transaction request, through the multi-dimensional commerce platform 240. For example, the second server may route the transaction request to the multi-dimensional commerce platform 240, and cause a purchase of the item to occur. In such embodiments, from the perspective of the multi-dimensional commerce platform 240, the parties to the transaction include the second server and the multi-dimensional commerce platform 240, while from the perspective of the client device 260, the parties to the transaction include the client device 260 and the second server.

Figure 5:
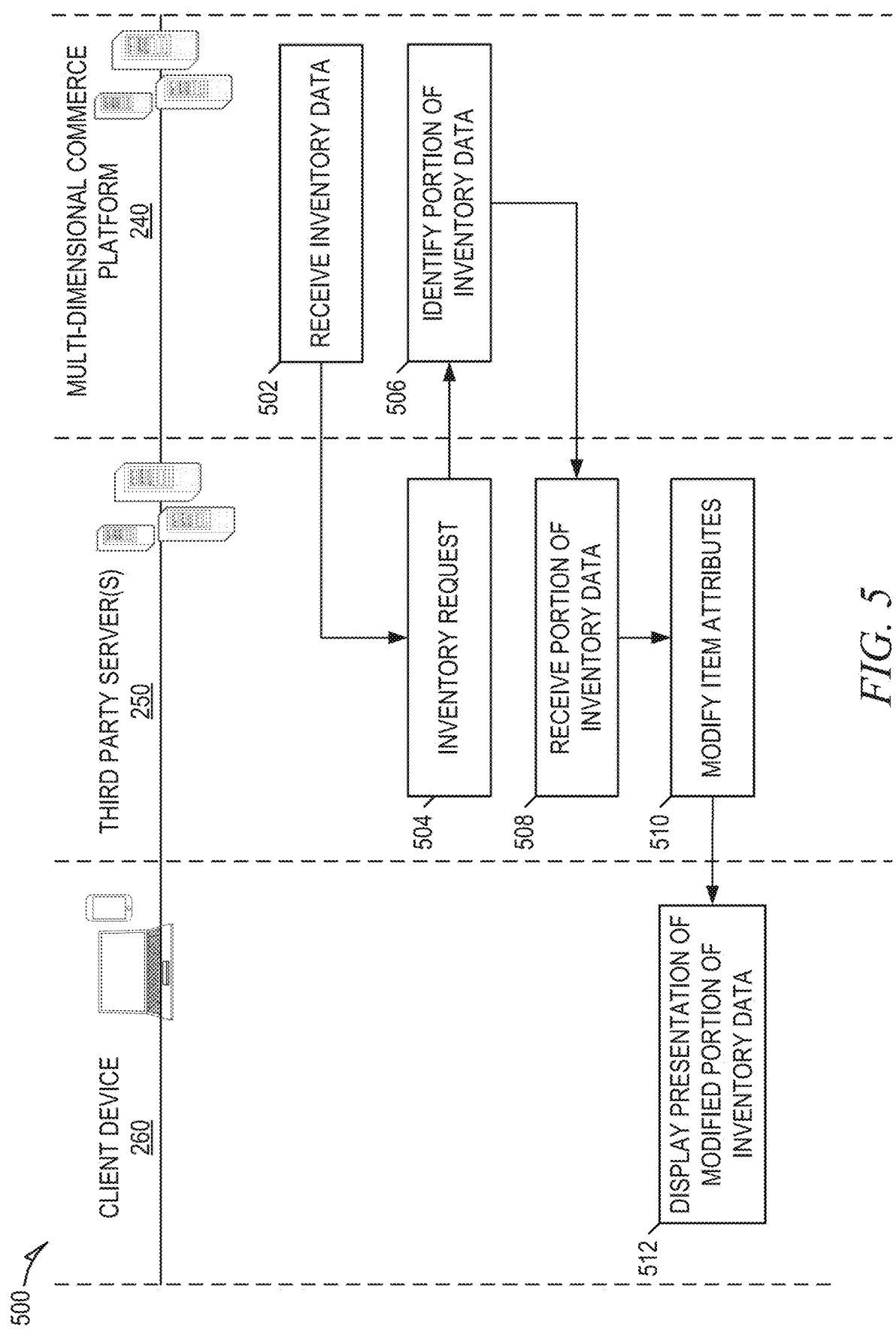
FIG. 5 is an interaction diagram illustrating various interactions between the multi-dimensional commerce platform, a second server, and a client device, according to an example embodiment.

FIG. 5 is an interaction diagram 500 illustrating various interactions between the multi-dimensional commerce platform 240, a second server (e.g., third party sever 250), and a client device 260, according to an example embodiment.

At operation 502, as described in operation 305 of the method 300 in FIG. 3, the multi-dimensional commerce platform 240 receives inventory data comprising a set of items. Each item among the set of items may include item attributes, such as an item description, an item price, item images, as well as an indication of a shipping location of the item, and a seller or retailer that carries the item. In some example embodiments, the inventory data may be received by the multi-dimensional commerce platform from a client device (e.g., client device 260), or from a server from among the third party servers 250. For example, the inventory data may be received from a third party website.

At operation 504, a second server (e.g., from among the third party servers 250) transmits an inventory request to the multi-dimensional commerce platform 240. The inventory request may include one or more search terms such as specific item attributes (e.g., a product category). In some example embodiments, the second server (e.g., third party servers 250) may transmit the inventory request to the multi-dimensional commerce platform 240 in response to receiving a search request from a client device 260. For example, the second server may be associated with a networked marketplace. A user of the client device 260 may browse the networked marketplace and provide one or more search requests for items. In response to receiving the search request at the second server, the second server may transmit an inventory request to the multi-dimensional commerce platform 240 in order to receive and cause display of a set of search results comprising one or more items, at the client device 260. At operation 506, the multi-dimensional commerce platform 240 identifies a portion of the received inventory data based on the inventory request from the second server, and at operation 508, the second server receives the identified portion of the inventory data.

At operation 510, the second server (e.g., third party servers 250), modify item attributes of the portion of the inventory data. For example, the second server may have an associated set of configuration instructions, such that the inventory data is modified based on the configuration instructions. The configuration instructions may for example include a display language, a price adjustment, as well as a display format. At operation 512, the second server causes the client device 260 to cause display of a presentation of the modified portion of the inventory data.

Figure 6:
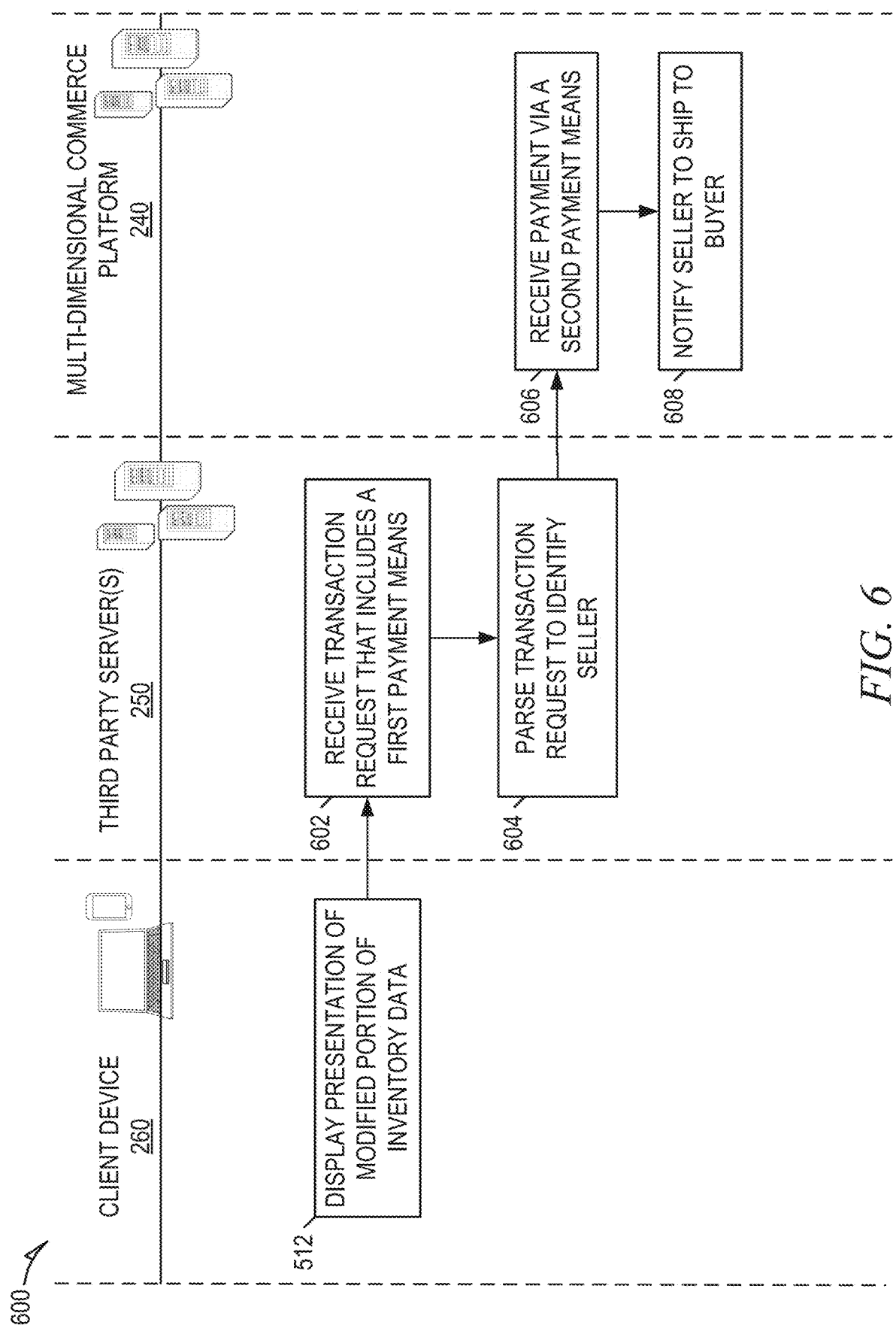
FIG. 6 is an interaction diagram illustrating various interactions between the multi-dimensional commerce platform, a second server, and a client device, according to an example embodiment.

FIG. 6 is an interaction diagram 600 illustrating various interactions between the multi-dimensional commerce platform 240, a second server (e.g., third party sever 250), and a client device 260, according to an example embodiment.

As discussed in FIG. 5, at operation 512, the second server causes the client device 260 to cause display of the presentation of the modified portion of the inventory data. The presentation of the modified portion of the inventory data may include one or more fields to receive user inputs to purchase an item from among the modified portion of inventory data. For example, a user of the client device 260 may provide a user input that includes a transaction request into the presentation of the modified portion of the inventory data.

At operation 602, the second server (e.g., third party servers 250), receive the transaction request from the client device 260. In some example embodiments, the transaction request may include an identification of an item from among the modified portion of the inventory data, as well as a first payment means. For example, the first payment means may be a specific type of payment method associated with the second server, such as a local currency, or a credit to a website associated with the second server.

At operation 604, the second server parses the transaction request to identify a seller of the item of the transaction request, based on the identification of the item. The second server may access the multi-dimensional commerce platform 240 in order to retrieve additional seller information.

At operation 606, the multi-dimensional commerce platform 240 receives a payment for the item, wherein the payment may include a second payment means. The second payment means may be different from the first payment means. For example, the second payment means may include a different currency, or payment method (e.g., PAYPAL). At operation 608, the multi-dimensional commerce platform 240 notifies the seller of the item of the transaction request, wherein the notification includes shipping information associated with the user of the client device 260.

Figure 7:
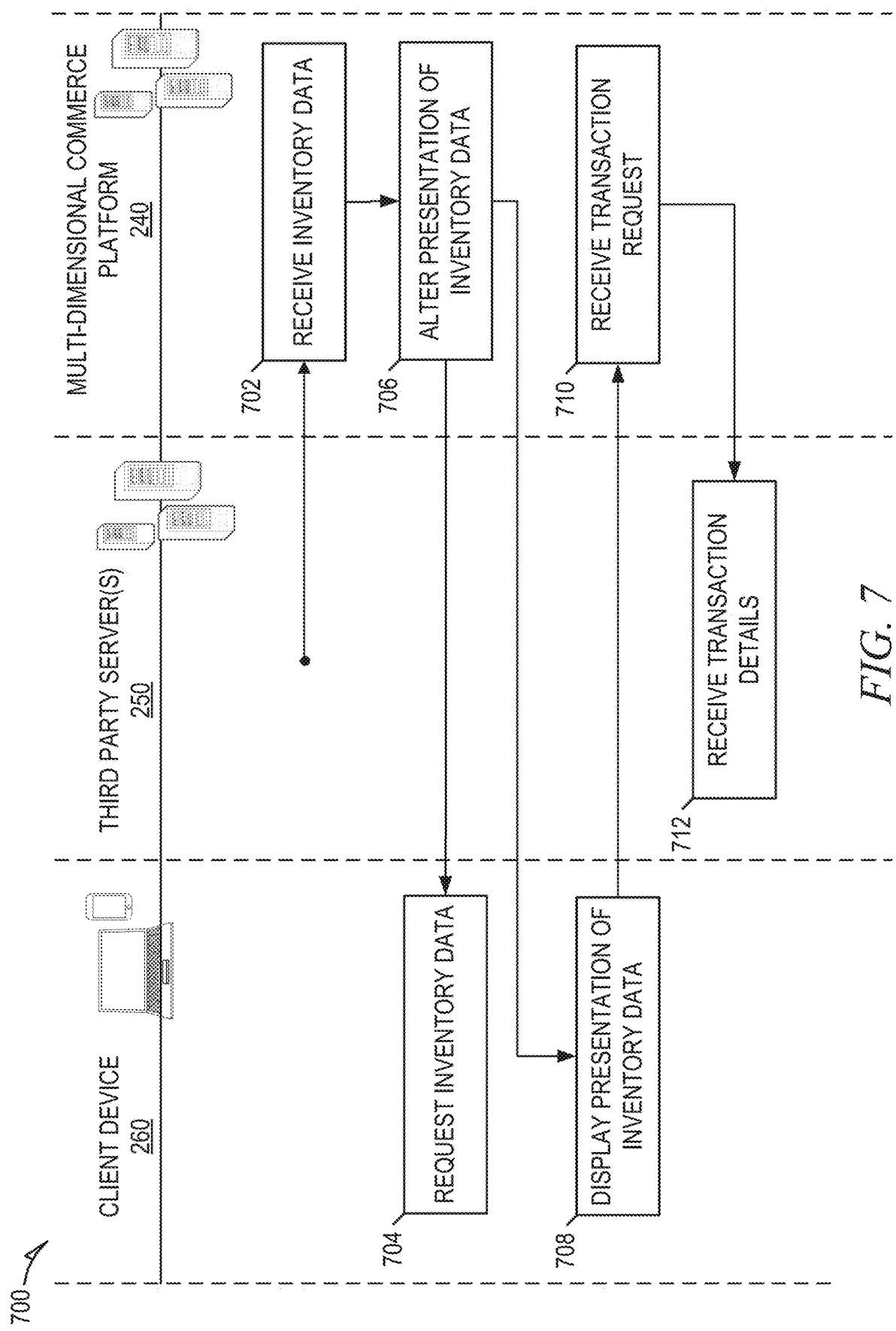
FIG. 7 is an interaction diagram illustrating various interactions between the multi-dimensional commerce platform, a second server, and a client device, according to an example embodiment.

FIG. 7 is an interaction diagram 700 illustrating various interactions between the multi-dimensional commerce platform 240, a second server (e.g., third party sever 250), and a client device 260, according to an example embodiment.

At operation 702, the multi-dimensional commerce platform 240 receives inventory data from the third party servers 250. The third party servers 250 may be associated with a third party seller, wherein the third party seller has a corresponding URL used to distribute items represented by the inventory data (e.g., StubHub). For example, the third party seller may maintain the inventory data at the third party servers 250, and cause display of a presentation of the inventory data at client devices accessing the URL associated with the third party seller. As an illustrative example, the third party seller may be associated with a webpage accessible through a URL, and the inventory data may comprise tickets to sporting events. Users may access the URL of the third party seller, and in response, the third party servers 250 generate and cause display of a presentation of the inventory data at client devices of the requesting users. The presentation of the inventory data may follow a presentation format associated with the third party seller—for example, the presentation may include a set of item listings with a specified orientation and arrangement, logos associated with the third party seller, as well as shipping details based on a location of the third party seller.

At operation 704, a client device 260 may transmit a request to the multi-dimensional commerce platform 240, wherein the request includes a request to display inventory data. For example, the request may be a search request into a graphical user interface associated with the multi-dimensional commerce platform 240, wherein the graphical user interface is accessible through a URL. The search request may include search terms identifying item attributes of the inventory data.

In some example embodiments, operations 702 and 704 may occur in reverse order. In such embodiments, in response to receiving a search request for inventory data (e.g., operation 704), the multi-dimensional commerce platform 240 may request inventory data from the third party servers 250.

At operation 706, the multi-dimensional commerce platform 240 alters the presentation of the inventory data based on a set of presentation configuration instructions. The multi-dimension commerce platform 240 may be associated with a networked marketplace, wherein users may upload and create item listings for items, and buyers may view the item listings through a graphical user interface. In such embodiments, the item listings may share a set of common listing attributes, such as a presentation format. The multi-dimensional commerce platform may therefore modify the presentation of the inventory data by generating a set of item listings based on the presentation configuration instructions. The presentation configuration instructions may for example indicate a presentation format, as well as a display of logos associated with the multi-dimensional commerce platform 240.

At operation 708, the client device 260 causes display of the altered presentation of the inventory data. From the perspective of the client device 260, the inventory data may simply appear as though it is being offered through the multi-dimensional commerce platform 240.

At operation 710, the multi-dimensional commerce platform 240 receives a transaction request for an item from among the inventory data from the client device 260. The transaction request includes transaction details such as an identification of the item from among the inventory data, as well as an identification of the client device 260. In some example embodiments, the transaction request may additionally include payment details.

At operation 712, the third party servers 250 receive the transaction details of the transaction request from the multi-dimensional commerce platform 240. The seller associated with the third party servers 250 may then ship or otherwise transfer the item identified by the transaction details to the user associated with the client device 260.

Machine Architecture

Figure 8:
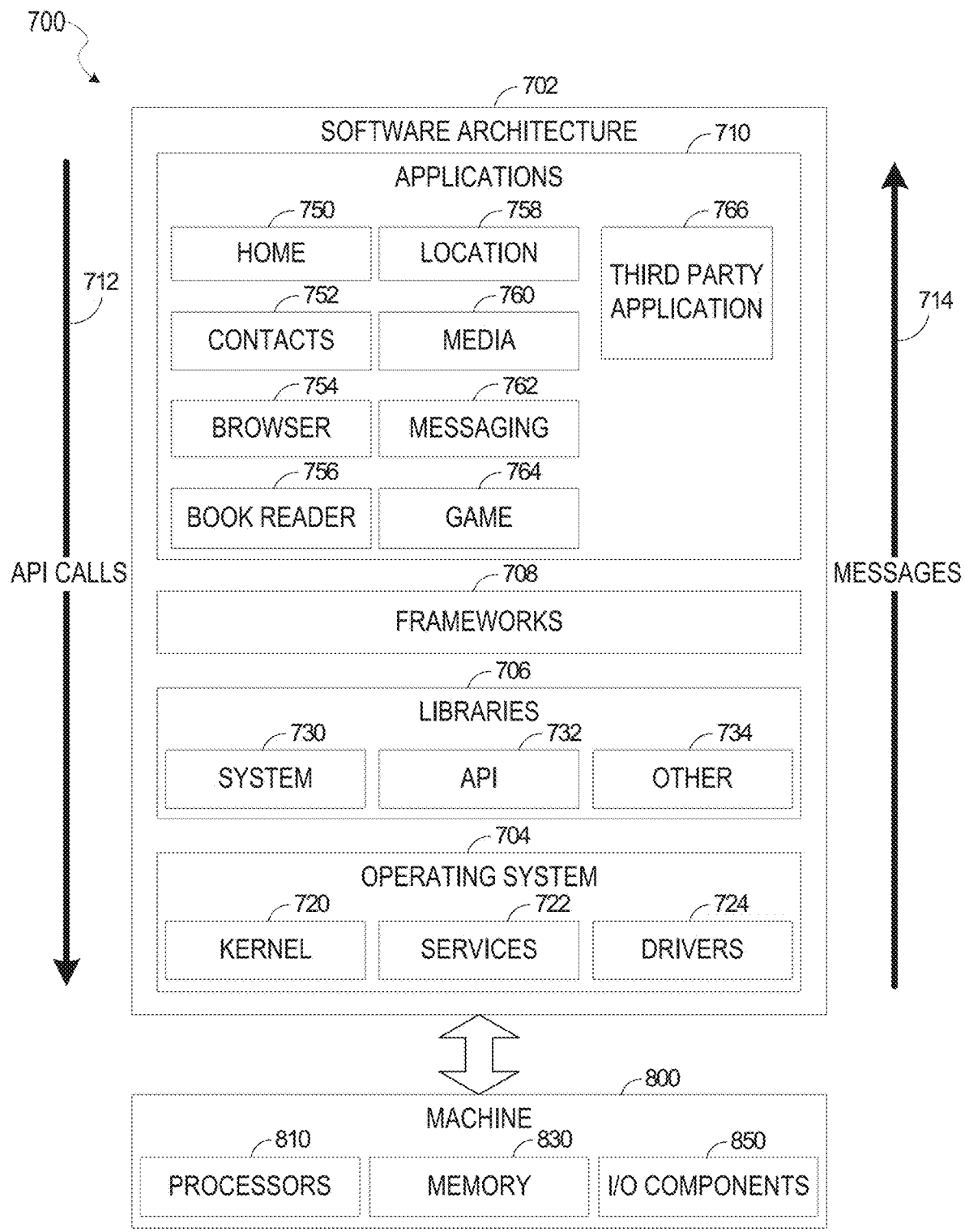
FIG. 8 is a block diagram illustrating an architecture of software, which can be installed on any one or more of the devices described herein, according to an example embodiment.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
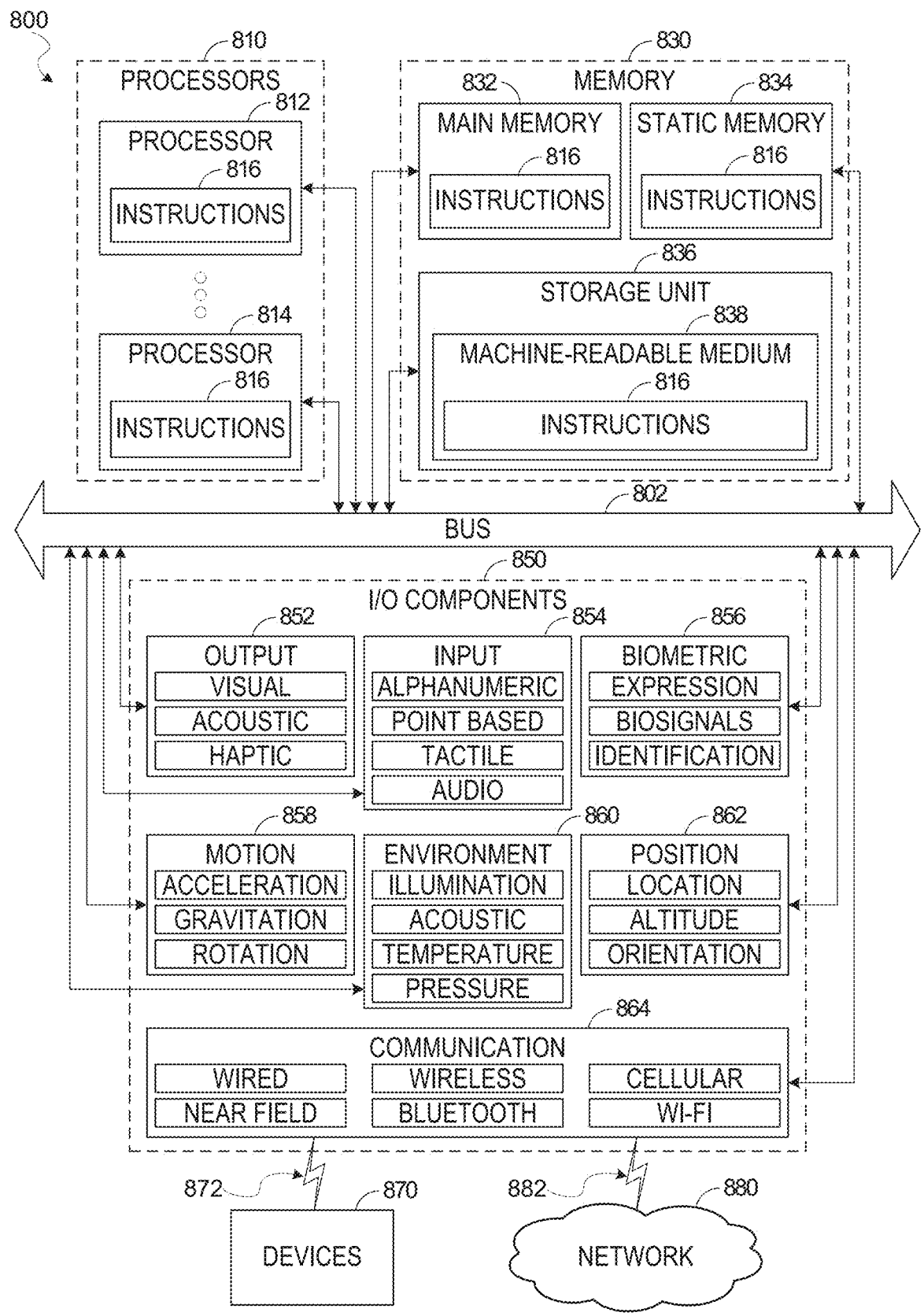
FIG. 9 illustrates a diagrammatic representation of a machine in the form of a computer system within which a set of instructions may be executed for causing the machine to perform any one or more of the methodologies discussed herein, according to an example embodiment

FIG. 9 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the method 900 of FIG. 9. Additionally, or alternatively, the instructions 916 may implement FIGS. 3-6, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, both accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions, when executed by processor(s) 910 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
   transmitting from a networked platform to a server, an inventory request that includes an identifier and at least one term related to a first item;
   receiving data from the server in response to transmitting the inventory request;
   identifying inventory data having item attributes where the inventory data is identified based on the inventory request and having a first format;

modifying, at the networked platform, at least one of the item attributes based on configuration information stored at the networked platform;
causing the modified at least one of the item attributes to be displayed on a client device in a second format where the modifying causes the at least one of the item attributes to be displayed on the client device in the second format that is different from the first format;
receiving, at the networked platform, a transaction request from the client device in response to causing the modified at least one of the item attributes to be displayed on a client device, the transaction request including an entity;
parsing the transaction request to identify the entity associated with the transaction request;
providing, from the networked platform, transactions details to the server in response to receiving the transaction request; and
notifying, by the server, the entity of the transaction request.

2. The method of claim 1, wherein the networked platform maintains a configurations database comprising one or more presentation configurations, each associated with a corresponding source server.

3. The method of claim 1, wherein the method further comprises causing a purchase of the first item.

4. The method of claim 1, wherein the item attributes include a price and a first display language, and the modifying the at least one of the item attributes includes:
translating the first display language to a second display language; and
altering the price.

5. The method of claim 1, wherein the item attributes of the first item include an item description, an item image, and a display format for the first item, and the modifying the at least one of the item attributes includes modifying the item description, the item image, and the display format of the first item based on the configuration information.

6. The method of claim 1, wherein the causing display of a presentation of the first item at the client device includes generating a graphical user interface that includes the presentation of the first item.

7. A non-transitory machine-readable storage medium, storing instructions which, when executed by at least one processor of a networked platform, cause the networked platform to perform operations comprising:
transmitting to a server an inventory request that includes an identifier and at least one term related to a first item;
receiving data from the server in response to transmitting the inventory request;
identifying inventory data having item attributes where the inventory data is identified based on the inventory request and having a first format;
modifying, at the networked platform, at least one of the item attributes based on configuration information stored at the networked platform;
causing the modified at least one of the item attributes to be displayed on a client device in a second format where the modifying causes the at least one of the item attributes to be displayed on the client device in a second format that is different from the first format;
receiving, at the networked platform, a transaction request from the client device in response to causing the modified at least one of the item attributes to be displayed on a client device, the transaction request including an entity;
parsing the transaction request to identify the entity associated with the transaction request;
providing, from the networked platform, transactions details to the server in response to receiving the transaction request; and
notifying, by the server, the entity of the transaction request.

8. The non-transitory machine-readable storage medium of claim 7, wherein the item attributes include a price and a first display language, and when modifying the at least one of the item attributes, the instructions cause the networked platform to perform operations further comprising:
translating the first display language to a second display language; and
altering the price.

9. The non-transitory machine-readable storage medium of claim 7, wherein the item attributes of the first item include an item description, an item image, and a display format for the first item, and the modifying the at least one of the item attributes includes modifying the item description, the item image, and the display format of the first item based on the configuration information.

10. The non-transitory machine-readable storage medium of claim 7, wherein when causing display of a presentation of the first item at the client device, the instructions cause the networked platform to perform operations further comprising generating a graphical user interface that includes the presentation of the first item.

11. A networked platform comprising:
one or more processors; and
a memory storing instructions that, when executed by at least one processor among the one or more processors, causes the networked platform to perform operations comprising:
transmitting, from the networked platform to a server, an inventory request that includes an identifier and at least one term related to a first item;
receiving data from the server in response to transmitting the inventory request;
identifying inventory data having item attributes where the inventory data is identified based on the inventory request and having a first format;
modifying, at the networked platform, at least one of the item attributes based on configuration information stored at the networked platform;
causing the modified at least one of the item attributes to be displayed on a client device in a second format where the modifying causes the at least one of the item attributes to be displayed on the client device in a second format that is different from the first format;
receiving, at the networked platform, a transaction request from the client device in response to causing the modified at least one of the item attributes to be displayed on a client device, the transaction request including an entity;
parsing the transaction request to identify the entity associated with the transaction request;
providing, from the networked platform, transactions details to the server in response to receiving the transaction request; and
notifying, by the server, the entity of the transaction request.

12. The networked platform of claim 11, wherein the networked platform maintains a configurations database comprising one or more presentation configurations, each associated with a corresponding source server.

13. The networked platform of claim 11, wherein the item attributes include a price and a first display language, and when modifying the at least one of the item attributes, the instructions cause the networked platform to perform operations further comprising:

translating the first display language to a second display language; and altering the price.

14. The networked platform of claim 11, wherein the instructions cause the networked platform to perform operations further comprising causing a purchase of the first item.

15. The networked platform of claim 11, wherein the item attributes of the first item include an item description, an item image, and a display format for the first item, and the modifying the at least one of the item attributes includes modifying the item description, the item image, and the display format of the first item based on the configuration information.

16. The networked platform of claim 11, wherein when causing display of a presentation of the first item at the client device, the instructions cause the networked platform to perform operations further comprising generating a graphical user interface that includes the presentation of the first item.

* * * * *